United States Patent Office 2,803,572
Patented Aug. 20, 1957

2,803,572

SOLDERING FLUX

Otto Konig, Forest Hills, N. Y., assignor to National Lead Company, New York, N. Y., a corporation of New Jersey No Drawing. Application July 27, 1955,
Serial No. 524,825

7 Claims. (Cl. 148—23)

This invention relates to a non-corrosive soldering flux and, more particularly, to an aqueous soldering flux which leaves no residue after the soldering operation.

An ideal soldering flux must dissolve oxide films on the metals to be joined so as to clean their surfaces, and must lower surface tension to enable wetting of the metals to be joined by the solder. Hydrochloric acid, zinc chloride, and other halide fluxes accomplish the above mentioned tasks well. For many purposes, such as for instance, dip soldering automobile radiators, after-corrosion by the residue left by the flux is not only undesirable but extremely important to avoid. Under such conditions, corrosive fluxes require to be thoroughly washed off the metal surfaces by repeated washings. A large variety of organic substituted ammonium halides have been proposed to leave non-corrosive residues in conjunction with the usual poor spreading rosin base, such fluxes being generally recommended for electrical connections. These have not been completely satisfactory. Traces of anionic halides, prone to hydrolysis in the presence of moisture, even the moisture of humid atmospheres, gradually form corrosive acids or salts and promote corrosion in or near the soldered connection.

Among the fluxing compositions heretofore suggested as a partial answer to the corrosion problem have been fluxes containing hexamethylenetetramine as one of the fluxing agents. These fluxes, however, were not entirely successful because, although hexamethylenetetramine possesses a certain fluxing power, that power is not sufficiently great to make a good flux when hexamethylenetetramine is used alone, while the addition of other agents such as acids, esters, or metal salts to improve the fluxing action commonly involved, to the extent they were used, the disadvantages above mentioned. It has, in fact, been found that the use of acid media actually militates against and largely destroys the fluxing action of the hexamethylenetetramine itself, as hexamethylenetetramine decomposes quickly in acid media to ammonia and formaldehyde, and thus loses all fluxing activity. Although the residue left by some of these fluxes was initially of a relatively non-corrosive nature, the residues were generally unstable to atmospheric conditions and tended in time to produce corrosive breakdown products.

The flux of the present invention obviates the difficulty of an eventual corrosive residue by leaving no residue, the flux having the unique property of being entirely volatilized at the temperatures prevailing during the soldering operation.

These temperatures will generally be about 100° F. higher than the melting point of the solder composition used, and are ordinarily between 500 and 600° F., but may range as high as about 800° F. with high-melting, low-tin solders.

It is, therefore, the principal object of this invention to offer a soldering flux which will leave no residue. Another object is to provide a non-corrosive soldering flux. Other objects and advantages will become apparent from the following more complete description and claims.

Broadly, this invention contemplates a soldering flux comprising an aqueous solution of (1) a salt of hexamethylenetetramine with a volatile acid and (2) a small proportion of an alkaline agent, said proportion being effective to provide a substantially neutral pH in said solution, said alkaline agent being volatile at soldering temperatures.

The presence of the acid is apparently necessary to convert the hexamethylene to a salt form, as hexamethylenetetramine per se does not have sufficient "bite" to dissolve oxide films, and is therefore deficient in its fluxing action. The reactions and mechanisms involved in this fluxing system are not fully established, and applicant therefore does not wish to be limited by the above or any particular theoretical explanation. For example, the "bite" provided by the compositions of this invention may be due to the action of the acid itself, rather than the hexamethylenetetramine salt. The above explanation, however, does not appear to fit the observed facts.

Similarly, it appears to be important, with respect to the stability of the solutions, to avoid the presence of substantial quantities of free acid in solution, and the prevention of the same appears to be the useful function of the excess alkaline stabilizing agent, which is believed to exert a buffering action, thereby controlling the amount of free acid in solution, and keeping it at a low level.

Among the volatile acids particularly preferred in the practice of this invention are the hydrohalic acids, such as HCl, HBr, HI, and HF. Other volatile acids, such as acetic acid, propionic acid, formic acid and nitric acid may be used if desired.

The action of the flux of this invention is twofold in nature; first, it acts to clean the surface of oxide by controlled acid hydrolysis of the salt (i. e. dissociation to produce the acid corresponding to the anion of the salt), secondly, it acts as a reducing agent of considerable strength by the formation of formaldehyde. The flux breaks down in the soldering operation into formaldehyde (picking up oxygen from the atmosphere or the solvent) and ammonia, both of which are volatilized along with water and the halide acid or other volatile acid, as the case may be, leaving no residue at all.

The halide salts of hexamethylenetetramine, as previously pointed out, are particularly active fluxes. Aqueous solutions thereof are somewhat unstable, but may easily be buffered against hydrolysis by the presence of an alkaline base to an extent of about 2 parts in 1000 more or less. A slight excess of the hexamethylenetetramine itself, ammonium hydroxide or any one of a variety of substituted ammonium bases may be selected to provide stabilization of aqueous solutions of hexamethylenetetramine salts, as will be evident to those skilled in the art.

If desired, the compositions of this invention may be prepared from hexamethylenetetramine and the salt of a basic stabilizing agent as above described with a volatile acid, for example ammonium chloride, pyridine hydrochloride, piperidine hydrobromide, etc. In aqueous solution, the acid appears to be redistributed and to become associated partly with the hexamethylenetetramine and partly with the stabilizing base, to form solutions of the same general character as those previously described.

It is also preferable to add a small proportion of a wetting agent, preferably a non-ionic agent, to the solution, 1 part in 2000 more or less being sufficient therefor. For this purpose, any conventional wetting agent may be used, provided it is stable and effective in solutions of approximately neutral acidity and volatile at soldering temperatures. Preferably, of course, the wetting agent selected should be one which, like the flux itself, leaves no residue, or else one which leaves a non-corrosive residue. The character of the residue left by the wetting agent, in any event, is less likely to be significant than that of residue left by the flux itself, in view of the relatively insignificant amount of wetting agent employed. Among the suitable wetting agents may be mentioned Sterox SE, Igepal and isooctyl alcohol.

A number of solutions of halide salts were found to result in excellent fluxes, including some with a proportion of from 0.2% to 0.5% of such stabilizing bases as ammonium hydroxide, benzylamine, laurylamine, and other amines which volatilize at soldering temperature, such as piperidine, pyridine, trimethylamine, converted to their ammonium forms in solution.

The active salts of this invention may be prepared in dry form by mixing the equivalent amounts of hexamethylenetetramine and acid, each dissolved in alcohol, whereupon the salts crystallize out and are recovered by filtration. They may also be prepared directly in aqueous solution by mixing equivalent amounts of base and acid in aqueous solution. They may also be prepared by adding an aqueous solution of ammonium halide to an aqueous solution of hexamethylenetetramine with no extracting care as to relative amounts except that the total base must be kept in excess of the calculated halogen ion, to provide the stabilizing action previously mentioned.

Among hexamethylene salt solutions of this invention, the following are examples:

(1) 8 g. hexamethylenetetramine
    1 ml. hydrobromic acid (40%)
    0.5 ml. wetting agent
    Made to 1 l. with tap water
(2) 10 g. hexamethylenetetramine
    8 ml. hydrobromic acid (40%)
    0.5 ml. wetting agent
    Made to 1 l. with tap water
(3) 12 g. hexamethylenetetramine
    8 ml. hydrobromic acid (40%)
    0.5 ml. wetting agent
    Made to 1 l. with tap water
(4) 16 g. hexamethylenetetramine
    8 ml. hydrobromic acid (40%)
    0.5 ml. wetting agent
    Made to 1 l. with tap water
(5) 10 g. hexamethylenetetramine
    8 ml. hydrobromic acid (40%)
    8 ml. concentrated ammonium hydroxide
    0.5 ml. wetting agent
    Made to 1 l. with tap water
(6) 10 g. hexamethylenetetramine
    8 ml. hydrobromic acid (40%)
    4 ml. benzylamine
    0.5 ml. wetting agent
    Made to 1 l. with tap water
(7) 10 g. hexamethylenetetramine
    8 ml. hydrobromic acid (40%)
    4 ml. laurylamine
    0.5 ml. wetting agent
    Made to 1 l. with tap water
(8) 10 g. hexamethylenetetramine
    8 ml. hydrobromic acid (40%)
    4 ml. piperidine
    0.5 ml. wetting agent
    Made to 1 l. with tap water
(9) 10 g. hexamethylenetetramine
    8 ml. hydrobromic acid (40%)
    4 ml. pyridine
    0.5 ml. wetting agent
    Made to 1 l. with tap water
(10) 10 g. hexamethylenetetramine
    8 ml. hydrobromic acid (40%)
    8 ml. trimethylamine (25% solution in water)
    0.5 ml. wetting agent
    Made to 1 l. with tap water
(11) 10 g. hexamethylenetetramine
    8 ml. hydrobromic acid (40%)
    4 ml. triethanolamine
    0.5 ml. wetting agent
    Made to 1 l. with tap water
(12) 10 g. hexamethylenetetramine
    10 g. ammonium iodide
    0.5 ml. wetting agent
    Made to 1 l. with tap water
(13) 10 g. hexamethylenetetramine
    10 g. ammonium bromide
    0.5 ml. wetting agent
    Made to 1 l. with tap water
(14) 10 g. hexamethylenetetramine
    10 g. ammonium chloride
    0.5 ml. wetting agent
    Made to 1 l. with tap water
(15) 12 g. hexamethylenetetramine
    6 ml. hydrobromic acid (48%)
    0.5 ml. wetting agent
    4.5 ml. concentrated ammonium hydroxide solution
    Made to 1 l. with tap water
(16) 12 g. hexamethylenetetramine
    6 ml. hydrobromic acid (48%)
    0.5 ml. wetting agent
    6.2 ml. concentrated ammonium hydroxide solution
    Made to 1 l. with tap water
(17) 12 g. hexamethylenetetramine
    6 ml. hydrobromic acid (48%)
    0.5 ml. wetting agent
    8 ml. concentrated ammonium hydroxide solution
    Made to 1 l. with tap water
(18) 12 g. hexamethylenetetramine
    6 ml. hydrobromic acid (48%)
    0.5 ml. wetting agent
    Made to 1 l. with tap water All of the above solutions were employed in soldering copper test strips with a 50–50 tin-lead solder and were found to effect an equal or better flow of solder than standard aqueous fluxes, and all were found to leave no residue. The soldering test was performed as follows:

A 1.5 x 1.5 inch copper sheet was wetted with flux solution and a button of 0.52 gram weight of 50–50 tin-lead solder place on it, the plate being in a horizontal position on a wire gauze net. It was then heated by a Bunsen burner flame from underneath until the solder button just started to melt and the heating immediately interrupted at this point. The solder spread over the copper covering an area which, in most cases, was at least as large or larger than the zinc-ammonium chloride fluxed sample employed. No residue was observed after soldering and the copper stayed remarkably clean. No corrosion effects were observed immediately after soldering, nor on two weeks' exposure to the atmosphere at room temperature, nor at an exposure of ten days to an atmosphere saturated with water vapor and a temperature of 65° C.

The fluxes of this invention are inexpensive and easily prepared, stable in storage, and simple and effective to use. They are substantially non-corrosive, and leave no corrosive residue nor, in fact, substantially any residue at all.

While this invention has been described with reference to certain specific embodiments and by way of certain examples, no undue limitations are to be deduced therefrom, and the invention is not to be limited, except as set forth in the following claims.

I claim:

1. A soldering flux consisting essentially of an aqueous solution of (1) the hexamethylenetetramine salt of a volatile acid and (2) a small proportion of an alkaline agent, said proportion being effective to provide a substantially neutral pH in said solution, said alkaline agent being volatile at soldering temperatures.

2. A soldering flux consisting essentially of an aqueous solution of (1) the hexamethylenetetramine salt of a volatile acid and (2) a small proportion of an alkaline agent selected from the group consisting of hexamethylenetetramine, ammonium hydroxide and volatile substituted-ammonium compounds, said proportion being effective to provide a substantially neutral pH in said solution, said alkaline agent being volatile at soldering temperatures.

3. A soldering flux consisting essentially of an aqueous solution of (1) the hexamethylenetetramine salt of a volatile acid and (2) an amount at least approximately 2 parts per 1000 by weight of said solution of an alkaline agent selected from the group consisting of hexamethylenetetramine, ammonium hydroxide and volatile substituted-ammonium compounds.

4. A soldering flux consisting essentially of an aqueous solution of (1) the hexamethylenetetramine salt of a hydrohalic acid and (2) a small proportion of an alkaline agent, said proportion being effective to provide a substantially neutral pH in said solution, said alkaline agent being volatile at soldering temperatures.

5. A soldering flux consisting essentially of hexamethylenetetramine (1) the salt of a volatile acid and (2) a small proportion of an alkaline agent effective to inhibit the hydrolysis of said salt to liberate free acid, said alkaline agent being volatile at soldering temperatures.

6. A soldering flux consisting essentially of an aqueous solution of (1) the hexamethylenetetramine salt of a volatile acid and (2) a small proportion of an alkaline agent selected from the group consisting of ammonium hydroxide and amines volatile at soldering temperatures.

7. A soldering flux according to claim 6, wherein said amine is selected from the group consisting of piperidine, pyridine, trimethylamine, triethanolamine, benzylamine, laurylamine and hexamethylenetetramine.

References Cited in the file of this patent

UNITED STATES PATENTS 1,772,952     Knoth _____ Aug. 12, 1930